United States Patent [19]
Gatti et al.

[11] Patent Number: 4,713,714
[45] Date of Patent: Dec. 15, 1987

[54] COMPUTER PERIPHERAL SHOCK MOUNT FOR LIMITING MOTION-INDUCED ERRORS

[75] Inventors: John E. Gatti, Scottsdale; Carl R. Tarver, Phoenix, both of Ariz.

[73] Assignee: Motorola Computer Systems, Inc., Cupertino, Calif.

[21] Appl. No.: 801,886

[22] Filed: Nov. 26, 1985

[51] Int. Cl.$^4$ .................. G11B 17/02; G11B 33/08; F16M 13/00
[52] U.S. Cl. .................... 360/137; 360/97; 248/581; 248/613; 248/638
[58] Field of Search .................... 360/137, 97–99; 248/581, 613, 638

[56] References Cited
U.S. PATENT DOCUMENTS

| | | | |
|---|---|---|---|
| 4,488,192 | 12/1984 | Treseder | 360/97 |
| 4,553,183 | 11/1985 | Brown et al. | 360/137 |

FOREIGN PATENT DOCUMENTS 57-94961  6/1982  Japan .................. 360/137

*Primary Examiner*—Robert S. Tupper
*Attorney, Agent, or Firm*—Walter W. Nielsen

[57] ABSTRACT

A disk drive shock mount is provided which attenuates shocks and vibrations to a disk drive (1, FIG. 1). The mount comprises a cradle 20 which is affixed to the disk drive housing, and a mounting plate 10 which may be used to suitably secure the disk drive assembly 1 to the next higher level of assembly. Flexible, compressible vibration isolators 50 of rubber or plastic are used to couple the cradle to the mounting plate. Rigid pins 70 on the cradle mate with grommet-enclosed apertures 60, 61 in the mounting plate to limit the degrees of motion permitted between the cradle and the mounting plate.

14 Claims, 4 Drawing Figures

COMPUTER PERIPHERAL SHOCK MOUNT FOR LIMITING MOTION-INDUCED ERRORS

TECHNICAL FIELD

This invention relates generally to data processing peripheral equipment, and, in particular, to an improved disk drive shock mount.

BACKGROUND OF THE INVENTION

In the data processing arts, it is well known to employ memory devices in which relative movement occurs between a storage medium and one or more read/write heads. For example, magnetic and optical disk devices, tape drives, and magnetic drum devices employ such an arrangement.

Such devices are prone to generating errors when they are subjected to mechanical vibration and/or mechanical shocks when in operation. Such errors may arise, for example, in the process of storing the information on the media or in reading the information stored thereon. Generally, when vibration or shock is of sufficient magnitude to displace the read/write heads relative to the storage medium, there is a high probability that an error will result, since data will not be read from or written to where it is supposed to be, due to the temporary shift in location between the heads and the storage medium relative to one another.

Shocks and vibration to this type of equipment may originate from many sources, such as accidental bumping by equipment operators while a memory operation is in progress; proximity of heavy construction or other sources creating periodic small tremors; motion induced by the equipment environment (e.g. operation of the equipment in a moving vehicle); vibration caused by other components of the data processing system (e.g. printers, card punches, robot-controlled equipment, etc.); and operation of the equipment in an earthquake-prone region.

As mentioned above, vibration- and shock-induced errors can result in the loss of data as it is being stored onto the storage medium and/or as it is being read from the storage medium, with corresponding results ranging in effect from the merely inconvenient to the catastrophic. There is an urgent need in the data processing arts, therefore, to provide an inexpensive, yet effective means for attenuating the shocks and vibrations to which the above types of data storage devices are commonly subjected.

BRIEF SUMMARY OF INVENTION

Accordingly, it is an object of the present invention to provide an improved computer peripheral shock mount.

It is also an object of the present invention to provide an improved shock mount for computer peripherals such as memory storage devices in which relative motion occurs between the read/write heads and the storage medium.

It is a further object of the present invention to provide an improved disk drive shock mount.

These and other objects are achieved in accordance with a preferred embodiment of the invention by providing a computer peripheral shock mount comprising a computer peripheral housing enclosing a computer peripheral, a mounting plate accommodating the housing, and resilient means for coupling the housing to the mounting plate, whereby the computer peripheral is mechanically isolated from physical vibration and shocks incurred by the mounting plate.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
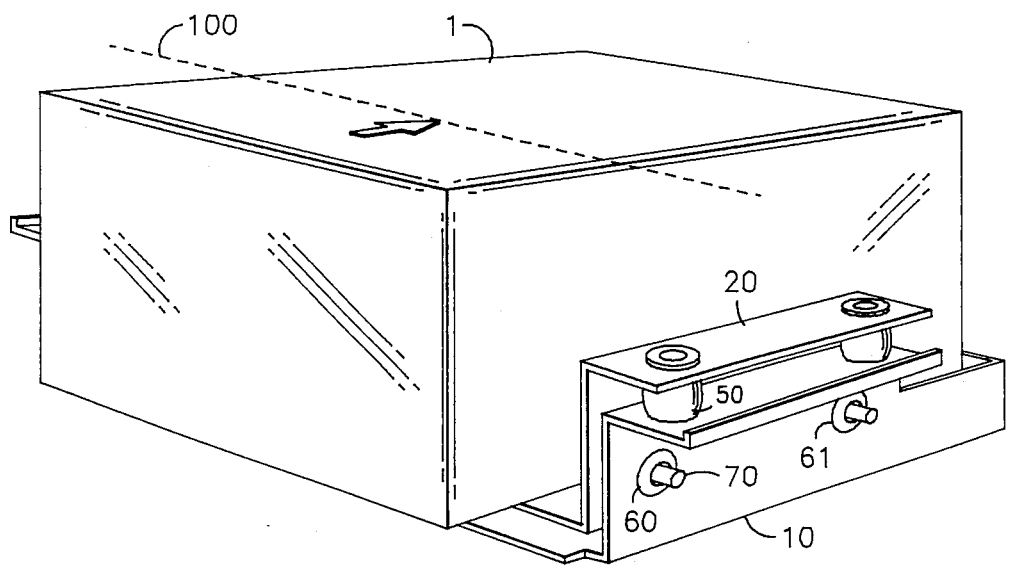
FIG. 1 shows a perspective view from the right and front of a disk drive assembly, cradle, and mounting plate, illustrating a preferred embodiment of the present invention.

Referring now to FIG. 1, a perspective view from the right and front of a disk drive assembly 1, cradle 20, and mounting plate 10 is shown. Disk drive assembly 1 is representative of any of the many commercially available disk drives. Suitable electrical connection (not shown) can be made between disk drive assembly 1 and the electronic system of which disk drive assembly 1 is a part, in order to functionally couple disk drive assembly 1 into such system.

Figure 2:
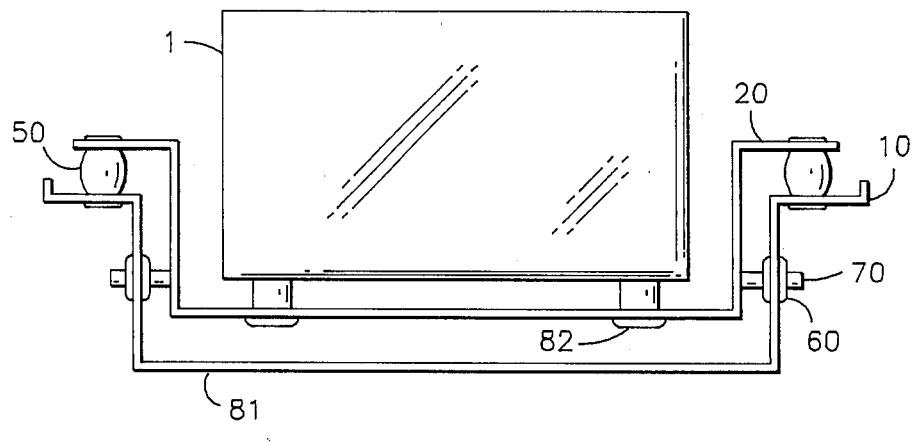
FIG. 2 shows a view of the disk drive assembly, cradle, and mounting plate illustrated in FIG. 1, looking from the front towards line 100 of FIG. 1.

FIG. 2 shows a view of the disk drive assembly 1, cradle 20, and mounting plate 10 illustrated in FIG. 1, looking from the front towards line 100 of FIG. 1. As seen from FIGS. 1 and 2, disk drive assembly or housing 1 rests in a cradle 20 which comprises a lower surface accommodating the disk drive assembly housing lower surface, a vertical wall on each side of the cradle lower surface, and a flange extending outwardly from each wall. Suitable means, such as screws 81 and 82 are provided for substantially rigidly securing disk drive assembly 1 to cradle 20.

In turn, cradle 20 rests in a mounting plate 10 having a lower surface accommodating the lower surface of cradle 20, a vertical wall on each side of its lower surface, and a flange extending outwardly from each wall. Mounting plate 10 may be substantially rigidly secured to an equipment enclosure (not shown) which houses other components in the computer or electronic system of which the peripheral subsystem shown in FIG. 1 is a part.

In order to attenuate the magnitude of mechanical shocks and vibrations reaching the disk drive assembly 1, resilient means are provided for coupling the cradle member 20 to the mounting plate 10 in the form of rubber or plastic compressible vibration isolators 50. In the preferred embodiment, members 50 are spheroid shaped. However, it will be understood that members 50 may be formed of any suitable material and may assume any appropriate shape that will serve as an effective shock absorber between cradle 20 and mounting plate 10.

Figure 3:
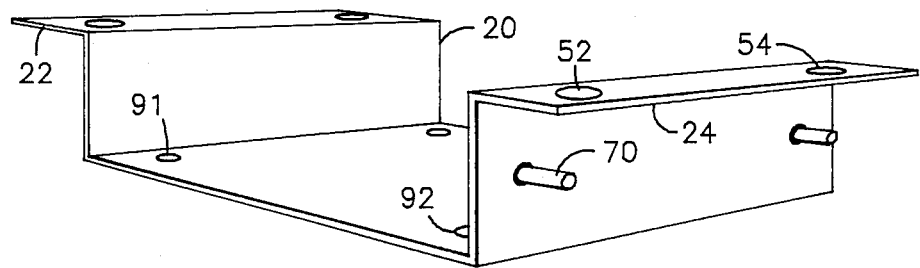
FIG. 3 shows a perspective view of a disk drive cradle, looking from the right and front.
Figure 4:
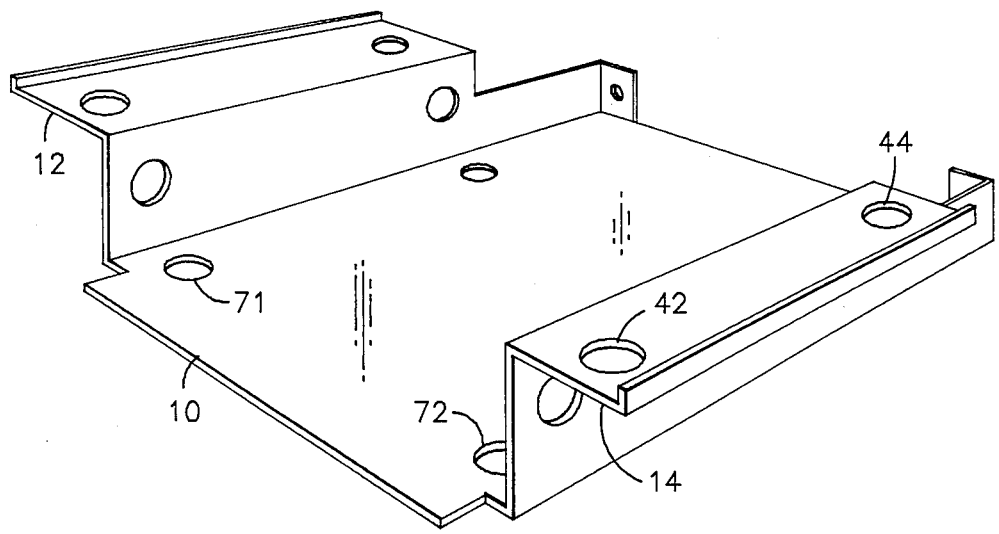
FIG. 4 shows a perspective view of a disk drive mounting plate, looking from the right and front.

While vibration isolators 50 may be secured by any appropriate means, in the preferred embodiment they have a grommet-like portion on each end which may be pushed into corresponding apertures 52,54 on the cradle 20 (refer to FIG. 3) and apertures 42,44 on the mounting plate 10 (refer to FIG. 4). The number and placement of the vibration isolators 50 is a function of the shock and vibration forces expected. In the preferred embodiment, two vibration isolators 50 are used on each side of the disk drive assembly 1.

In order to prevent undue motion of the cradle 20 relative to the mounting plate 10 in an up-and-down direction as well as in a back-and-forth direction along a line from the front of disk drive assembly 1 to the back thereof, movement limiters are provided in the form of protuberances 70 affixed to cradle 20. The protuberances 70 fit into corresponding grommet-lined apertures 60 and 61 in the mounting plate 10 (FIG. 1). The protuberances 70 are formed, in the preferred embodiment, of metal or other rigid material, but they could be formed of a more flexible material if desired. While apertures 60 and 61 of mounting plate 10 are shown as cushioned with rubber or plastic grommets, they could be lined with other suitable cushioning material.

FIG. 3 shows a perspective view of the disk drive assembly cradle 20, looking from the right and front. Apertures, such as apertures 52 and 54, are provided in the outwardly extending flanges 22 and 24 of cradle 20 to accommodate the grommet-like ends of vibration isolators 50 (refer to FIGS. 1 and 2). Apertures, such as apertures 91 and 92, are also provided in the lower surface of cradle 20 to facilitate securing cradle 20 to the disk drive assembly 1.

FIG. 4 shows a perspective view of the disk drive assembly mounting plate 10, looking from the right and front. In mounting plate 10, apertures such as apertures 42 and 44 are provided in the outwardly extending flanges 12 and 14 of mounting plate 10 to accommodate the grommet-like ends of vibration isolators 50 (refer to FIGS. 1 and 2). Apertures, such as apertures 71 and 72, are also provided in the lower surface of mounting plate 10 to facilitate securing mounting plate 10 to the equipment enclosure (not shown) which houses other components in the computer or other electronic system of which the peripheral subsystem shown in FIG. 1 is a part.

It will be apparent to those skilled in the art that the disclosed disk drive shock mount may be modified in numerous ways and may assume many embodiments other than the preferred form specifically set out and described above.

For example, the "form factor" or physical relationship among the disk drive assembly 1, cradle 20, and mounting plate 10 may assume any appropriate configuration and should not be limited to that as shown in the drawings. The number and placement of the cushioning members 50 between the cradle 20 and the mounting plate 10 may be altered. Also, the number and location of the motion-limiting members 70 may be rearranged as desired, depending upon the relative forces encountered between the cradle 20 and the mounting plate 10 and upon the space available in which motion is permitted to occur. Also the locations of the motion-limiting members 70 and grommet-lined apertures 60 and 61 could be reversed—i.e., the motion-limiting members 70 could be positioned on the mounting plate 10, and the grommet-lined apertures 60 and 61 could be positioned in cradle 20.

Accordingly, it is intended by the appended claims to cover all modifications of the invention which fall within the true spirit and scope of the invention.

What is claimed is:

1. A computer peripheral shock mount comprising:
   a computer peripheral housing enclosing a computer peripheral;
   a cradle member accommodating said housing;
   a mounting plate accommodating said cradle member; and
   limiting means for coupling said housing to said mounting plate, said limiting means comprising protuberant means on said cradle member and means on said mounting plate for receiving said protuberant means;
   whereby said computer peripheral is isolated from physical vibration shocks incurred by said mounting plate.

2. A computer peripheral shock mount comprising:
   a computer peripheral housing enclosing a computer peripheral, said housing having at least a lower surface;
   a cradle member having a lower surface accommodating said housing lower surface; a vertical wall on each side of said cradle lower surface; a flange extending outwardly from each wall; and means for substantially rigidly securing said peripheral housing to said cradle;
   a mounting plate having a lower surface accommodating said cradle lower surface; a vertical wall on each side of said mounting plate lower surface; and a flange extending outwardly from each wall;
   resilient means for coupling said cradle member to said mounting plate; and
   limiting means coupling said cradle member to said mounting plate for limiting the degree of motion of said cradle member relative to said mounting plate, said limiting means comprising protuberant means on said cradle member and means on said mounting plate for receiving said protuberant means;
   whereby said computer peripheral is isolated from physical vibration and shocks incurred by said mounting plate.

3. The computer peripheral shock mount recited in claim 2, wherein said protuberant means are affixed to said cradle member, and wherein said receiving means comprises apertures in said walls of said mounting plate, said protuberant means mating with said apertures.

4. The computer peripheral shock mount recited in claim 3, wherein said protuberant means comprises substantially rigid cylindrical members.

5. The computer peripheral shock mount recited in claim 3, wherein said apertures are lined with a resilient material.

6. The computer peripheral shock mount recited in claim 3, wherein said apertures are lined with grommets of rubber or plastic material.

7. The computer peripheral shock mount recited in claim 2, wherein said resilient means comprises at least one compressible member which is positioned between each said cradle flange and said mounting plate flange.

8. The computer peripheral shock mount recited in claim 7, wherein said resilient means comprises vibration isolators which are formed of a substantially compressible material.

9. The computer peripheral shock mount recited in claim 8, wherein said resilient means are formed of rubber or plastic material.

10. The computer peripheral shock mount recited in claim 7, wherein said cradle member comprises at least one aperture in each of said cradle flanges; wherein said mounting plate comprises at least one aperture in each of said mounting plate flanges; and wherein said at least one compressible member is located between corresponding ones of said cradle flange apertures and said mounting plate flange apertures.

11. The computer peripheral shock mount recited in claim 2, wherein said computer peripheral is a disk drive.

12. A disk drive shock mount comprising:
a housing enclosing a disk drive, said housing having at least a lower surface;
a cradle member having a lower surface slightly wider than said housing lower surface; means for substantially rigidly securing said housing to said cradle; a vertical wall on each side of said cradle lower surface; a pair of cylindrical pins extending outwardly from each wall; a flange also extending outwardly from each wall, each said flange comprising a pair of apertures;
a mounting plate having a lower surface slightly wider than said cradle lower surface; a vertical wall on each side of said mounting plate lower surface, said wall having a pair of grommet-lined apertures, said apertures being in the same relative locations as said cradle pins such that each of said cradle pins mates with a corresponding one of said apertures; and a flange extending outwardly from each wall, said flange having a pair of apertures in the same relative locations as said cradle flange apertures; and
compressible, resilient means positioned between said cradle flange apertures and said mounting plate flange apertures so as to connect said cradle member to said mounting plate;
whereby said disk drive is isolated from physical vibration and shocks incurred by said mounting plate; and whereby the degree of motion of said cradle relative to said mounting plate is limited.

13. The computer peripheral shock mount recited in claim 12, wherein said resilient means comprises vibration isolators which are substantially spheroid in shape.

14. The computer peripheral shock mount recited in claim 12, wherein said resilient means are formed of rubber or plastic material.

* * * * *